United States Patent [19]

Reinartz et al.

[11] Patent Number: 4,759,591
[45] Date of Patent: Jul. 26, 1988

[54] HYDRAULIC BRAKE SYSTEM

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 943,610

[22] Filed: Dec. 18, 1986

[30] Foreign Application Priority Data

Dec. 20, 1985 [DE] Fed. Rep. of Germany ....... 3545310

[51] Int. Cl.$^4$ .............................................. B60T 8/32
[52] U.S. Cl. ..................................... 303/116; 303/114
[58] Field of Search ............... 303/113, 114, 116, 115, 303/119

[56] References Cited

U.S. PATENT DOCUMENTS

| 3,910,643 | 10/1975 | Kobashi et al. | 303/114 |
| 3,999,808 | 12/1976 | Belart | 303/116 X |
| 4,657,315 | 4/1987 | Belart | 303/116 |

FOREIGN PATENT DOCUMENTS

| 2155131 | 9/1985 | United Kingdom | 303/114 |
| 2169975 | 7/1986 | United Kingdom | 303/116 |

*Primary Examiner*—Duane A. Reger
*Assistant Examiner*—Matthew C. Graham
*Attorney, Agent, or Firm*—James B. Raden; Robert P. Seitter

[57] ABSTRACT

A hydraulic brake system with a master cylinder actuatable by a brake pedal (44) by the intermediary of a power booster (1) and with valve means interposed between the master cylinder (3) and the wheel brakes (18, 19, 20, 21) connected thereto. Pressure fluid can be removed from the brake circuits (13, 14) and replenished subsequently out of an auxiliary-pressure source (4, 52, 53). An auxiliary piston (38, 64) is located between the force-output member (2) of the power booster (1), on the one hand, and the piston (31, 36) of the master cylinder (3), on the other hand, for the purpose of generating a controlled pressure, at the end of which auxiliary piston close to the master cylinder piston (31, 36) a duct (49) is provided which is closable by a valve ball (41) that cooperates with the portion of the master cylinder piston (31) close to the auxiliary piston (38). Both the auxiliary piston (38) and the pedal-side portion of the master cylinder piston (31, 36) plunge into a piston chamber (50) which communicates via a first pressure-fluid conduit (54, 56) with an auxiliary pressure source (4). The duct (49) contained in the auxiliary piston (38) is by way of a second pressure-fluid conduit (47, 46, 56, 58) in communication with pressure-fluid supply reservoir (5) so that, after pressure build-up has been effected, the pressure fluid prevailing in the piston chamber (50) is permitted to discharge into a pressure-fluid supply reservoir (5).

9 Claims, 3 Drawing Sheets

HYDRAULIC BRAKE SYSTEM

BACKGROUND OF THE INVENTION

The present invention relates to a hydraulic brake system with slip control for automotive vehicles. The system incorporates a master cylinder actuatable by a brake pedal directly or by the intermediary of a power booster. Valve means are provided between the master cylinder and the wheel brakes connected to the master cylinder through which pressure fluid can be removed from the brake circuits which can be subsequently replenished out of an auxiliary-pressure source. The stroke limitation of the brake pedal is performed during slip control.

A hydraulic brake system with the preceding features is known from German published patent application No. 30 40 562. This known system comprises a hydraulic brake power booster wherein a pressure of the booster proportional to the actuating force can be brought about through a pedal-actuatable brake valve. The hydraulic power booster permits actuation of a tandem master cylinder, to whose working chambers wheel brakes are connected. The connecting lines between the working chambers of the tandem master cylinder and the wheel brakes connected thereto can be interrupted by electromagnetically actuatable valve means. In addition, allocated to the wheel brakes are further valve means by which, in case of need, pressure fluid can be removed from the wheel brakes so that the effective braking pressure decreases which, as a result on occurrence of an imminent locked condition, causes the respective vehicle wheel to be re-accelerated sufficiently.

Pressure fluid which was removed from the wheel brakes during brake slip control is replenished out of the pressure chamber of the hydraulic power booster, the pressure fluid prevailing in the pressure chamber of the hydraulic power booster being supplied through additional valve means by way of the sleeves of the master cylinder pistons into the corresponding working chambers. With a view to safeguarding a minimum fluid volume in the tandem master cylinder, it is necessary in the known brake system that stroke limitation takes place. For this purpose, in the event of pressurization of the working chambers of the tandem master cylinder, a so-called positioning tube is simultaneously pressurized in the brake release direction in opposition to spring force, whereby the positioning tube moves into abutment on a stop of the booster piston and, due to the ratios of effective surfaces prevailing, prevents further displacement of the booster piston and of the master cylinder pistons.

As a whole, this known brake system is of relatively complicated design which is above all due to the booster piston being partially guided in the positioning tube, while, in turn, the outer periphery of said positioning tube is slidably arranged in the housing.

A brake system has also been proposed (P No. 33 38 249.2), wherein the end surface of the master cylinder piston facing the working chamber is larger than the effective surface of the booster piston and wherein a stepped piston is used as a master cylinder piston, an annular surface of the master cylinder piston being applicable with the pressure prevailing in the working chamber. Such a design permits the effective surface of the master cylinder piston to be reduced during normal braking actions, while valve means are provided allowing discontinuation of the pressurization of the annular surface of the master cylinder piston. Upon changeover of the valve means, the effective surface of the master cylinder piston will increase so that a resetting force will be exerted on the master cylinder piston, that is on the brake pedal, when the working chamber of the master cylinder is connected to the pressure chamber of the hydraulic power booster. For the valve means, an electromagnetically or hydraulically controllable two-way/two-position directional control valve is used.

It is the object of the present invention to design the braking pressure generator such that all necessary valves either are accommodated within the unit or are simplified to such extent as to allow reduction of the manufacturing costs of the brake system.

SUMMARY OF THE INVENTION

This object is achieved according to the present invention by an auxiliary piston which is arranged between the force-output member of the power booster or the actuating rod coupled to the brake pedal, on the one hand, and the piston of the master cylinder, on the other hand, at the end of which auxiliary piston close to the master cylinder piston a duct is provided which is adapted to be closed by a valve closure member, for instance a valve ball, which latter is held by the shaft portion of the master cylinder piston facing the auxiliary piston, with both the auxiliary piston and the pedal-side portion of the master cylinder piston plunging into a piston chamber which communicates by way of a first pressure-fluid conduit with an auxiliary-pressure source, for instant a motor-pump unit, while the duct contained in the auxiliary piston is in connection with the pressure-fluid supply reservoir by way of a second pressure-fluid conduit.

Preferably, a valve seat is provided at the end surface of the auxiliary piston facing the master cylinder piston as well as a valve closure member which is held and guided in a blind-end bore in the shaft portion of the master cylinder piston. The valve closure member is longitudinally displaceable in opposition to the force of a spring held in the blind-end bore and is axially limited in its displaceability by a radial projection, for instance a beaded portion at the shaft portion of the master cylinder piston.

Advantageously, the master cylinder bore accommodates a cylinder or a bushing in whose longitudinal bore the shaft portion of the master cylinder piston and the auxiliary piston are longitudinally slidably supported, with the space between the shaft portion and the auxiliary piston confining a piston chamber which, on the one hand, is in communication with the auxiliary-pressure source by way of an opening or a transverse duct and, on the other hand, is in communication with the pressure-fluid supply reservoir by way of a duct in the auxiliary piston, the pressure-fluid inlet or outlet of the piston chamber being controlled by a pressure control valve, for example a pressure-limiting valve.

Expediently, the master cylinder piston is designed as a stepped piston whose smaller step forming the shaft portion is accommodated in the bushing, while the large step of the master cylinder piston in conjunction with the end surface of the bushing close to the master cylinder, the shaft portion and the master cylinder bore confines an annular chamber which is in communication with the working chamber of the master cylinder by way of a pressure-fluid conduit in which a directional control valve is inserted. The auxiliary-pressure source communicates by way of a first pressure line with the piston chamber and by way of a second pressure line and, respectively, by way of branch lines with the brake lines, the branch lines containing non-return valves.

In order to design the brake system such that it can also be used as a hill holder, by means of which wheel slippage of the drive wheels can be prevented during vehicle acceleration, a pressure-limiting valve is inserted into the pressure line leading from the auxiliary-pressure source to the brake lines. The valve is in turn connected to the return line, while an electromagnetically actuatable shut-off valve is inserted into the pressure-fluid conduit providing communication between the duct of the auxiliary piston and the pressure-fluid supply reservoir.

BRIEF DESCRIPTION OF THE DRAWING

These and other advantages are set forth in greater detail in the following detailed description when taken in conjunction with the accompanying drawing wherein.

DETAILED DESCRIPTION

Figure 1:
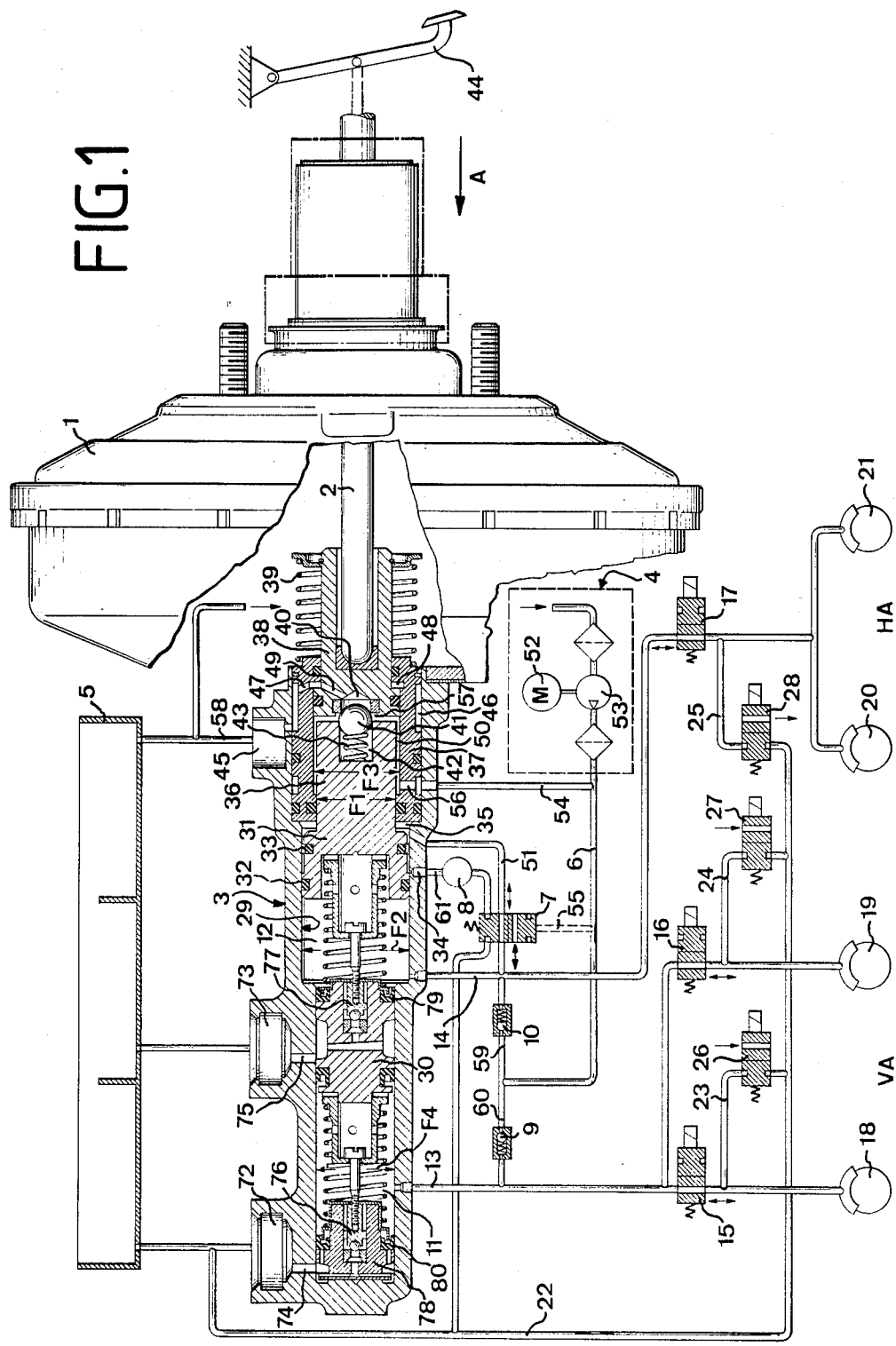
FIG. 1 illustrates a brake system in accordance with the principles of the present invention.

The brake system according to FIG. 1 is composed substantially of a vacuum brake power booster 1 with a force output member 2, a tandem master cylinder 3, an auxiliary-pressure source 4, a pressure-fluid supply reservoir 5, a directional control valve 7 with throttle 8 controlled by the pressure in the pressure line 6, the two non-return valves 9 and 10, the two brake lines 13, 14 connected to the working chambers 11 and 12, respectively, of the tandem master cylinder 3 and containing electromagnetically actuatable directional control valves 15, 16, 17, the wheel brakes 18 to 21, and the branch lines 23, 24, 25 providing communication between the return line 22 and the wheel brakes 18 to 21 and having inserted electromagnetically actuatable valves 26, 27, 28.

The master cylinder bore 29 is designed as a stepped bore, the floating piston 30 isolating the two working chambers 11, 12 from one another and being sealingly accommodated in the step of the master cylinder bore 29 of smaller cross-section. The primary piston or master cylinder piston 31 which simultaneously performs the function of a resetting piston is furnished with two ring seals 32, 33 and at its part close to the working chamber 12, the pedal-side rear ring seal 33 cooperating with a connecting bore 34 in such a fashion that, after the displacement of the primary piston 31 in the actuating direction (direction of arrow A), a pressure-fluid connection is established between the annular chamber 35 and the connecting bore 34 when the ring seal 33 has moved beyond the connecting bore 34.

The primary piston, that is resetting piston 31, comprises a shaft portion 36 which is accommodated in a cylindrical bushing 37 in whose pedal-side bore portion an auxilliary piston 38 is held and guided in addition. The piston 38 is retained in its initial position (as illustrated in the drawing) by a spring 39 and abuts on the force-output member 2 of the vacuum brake power booster. As its end surface close to the working chambers 11, 12 of the master cylinder 3, an indentation forming a valve seat 40 is arranged, cooperating therewith is a valve ball 41 which is held and guided in a blind-end bore 42 of the primary piston 31 and, respectively, the shaft portion 36 and which is acted upon by a closure spring 43.

Upon actuation of the brake pedal 44, the vacuum brake power booster starts to operate by its booster piston (not shown in detail) displacing the force-output member 2 and thus the piston 38 in the actuating sense (to the left). On this displacement, the pedal-side end surface of the shaft portion 36 abuts on the end surface of the piston 38 close to the master cylinder, and the valve ball 41 closes the pressure-fluid conduit leading from the pressure-fluid supply reservoir 5 to the piston chamber 50 via the connecting socket 45, the annular chamber 46, the radial bore 47 in the bushing 37, the annular chamber 48 and the duct 49. The hydraulic pressure developing in the two working chambers 11, 12 of the tandem master cylinder 3 as a result of the displacement of the primary piston 31 in the actuating direction (direction of arrow A) will now cause corresponding pressure build-up in the wheel cylinders of the wheel brakes 18 to 21 via the brake lines 13, 14 and the directional control valves 15, 16, 17 being in their opened position. Since the brake line 14 is likewise connected to the annular chamber 35 via a branch line 51 containing the directional control valve 7 and said directional control valve is in its opened position shown in the drawing, pressure fluid out of the working chamber 12 will flow into this annular chamber 35, too, so the only the cross-sectional surface F1, which corresponds to the cross-sectional surface F4 of the smaller step of the master cylinder bore 29, is effective.

As soon as one of the vehicle wheels reaches the slip range, a slip-monitoring electronics not shown in detail will activate the auxiliary pressure source 4, that means the electric motor 52 of the pump 53 will start, thereby causing higher pressure to develop in the pressure lines 6 and 54 and in the control line 55 of the directional control valve 7. As the pressure line 54 is in communication with the piston chamber 50 also via the transverse duct 56, the pressure fluid now aims at urging the two pistons 31 and 38 apart, since the said's cross-sectional surfaces F1 and F3, respectively, are pressurized. However, the opposing application the two pistons 31 and 38 by the full pump pressure will be terminated in that the valve ball 41 which is prevented by the beaded edge 57 of the shaft portion 36 of the piston 31 from moving out of the blind end bore 42 begins to lift from its valve seat 40 on the piton 38 so that the pressure fluid under high pressure is allowed to discharge into the pressure-fluid supply reservoir 5 via the duct 49, the radial bore 47, the annular chamber 46, the connecting socket 45 and the reservoir line 58. In this phase of the braking action, the valve 40, 41 acts as a pressure control valve and takes care that such amount of pressure develops in the pressure lines 6 and 54 and in the piston chamber 50 which is proportional to the pedal force acting on the brake pedal 44. As soon as the slip-monitoring electronics has now opened one of the valves 26, 27 or 28 in order to decrease the pressure in the corresponding wheel cylinder, pressure fluid delivered by the auxiliary pressure source 4 is permitted to enter, since the pressure line 6 of the pump 53 is in communication with the brake lines 13, 14 by way of branch lines 59, 60 containing the non-return valves 9, 10. It is clear that the pressure in the wheel cylinder of a wheel brake 18 to 21 can only be re-increased, if priorly the valve 26, 27, 28 enabling the return flow of the pressure fluid to the supply reservoir 5 has been closed again and the directional control valve 25, 16, 17 inserted in each case into the brake line 13 and 14, respectively, has assumed its opened position.

When the piston 31 of the master cylinder 3 has moved during a braking action so far in the actuating direction A that the ring seal 33 is on the left of the connecting bore 34, that means when the ring seal 33 has overridden the connecting bore 34, a pressure-fluid connection is constituted from the annular chamber 35 to the connecting bore 34 and thus via the line 61 to the directional control valve 7.

As in the case of braking pressure control, that means upon build-up of the pump pressure in the pressure line 6 and in the control line 55, respectively, the directional control valve 7 switches over, the supply of pressure fluid out of the brake line 14 via the branch line 51 into the annular chamber 35 will be shut off, so that return movement of the piston 31 (in opposition to the direction of arrow A) may only take place as long as the ring seal 33 acting like a valve is on the left of the connecting bore 34. On the other hand, if the piston 31 has moved in the actuating direction only so far that the ring seal 33 covers the connecting bore or is disposed on the right of the connecting bore 34, the piston 31 will be blocked, that means return flow of the pressure fluid out of the annular chamber 35 is precluded because the directional control valve 7 has disconnected the branch line 51 from the brake line 14, on the one hand, and the ring seal 33 has not released the connecting bore, on the other hand.

If the ratio of surfaces is F1:F3=1:1 in the embodiment of a brake system illustrated in FIG. 1, the pump 53, that is its driving motor 52, must start when the slip-monitoring electronics detects an imminent locked condition. Unit this point of time, braking is preformed exclusively statically. Upon the occurrence of an imminent locked condition the motor-pump unit 52, 53 is switched on so that the valve composed of the parts 36, 38, 40, 41, 42 and 43 controls the pressure in the precedingly described fashion in dependence on the pedal force applied (dynamic pressure, that is controlled pressure), the controlled pressure corresponding practically to the static pressure. However, if the surface F1 is chosen such as to be larger than the surface if the surface F3, braking will be performed with hydraulic boosting. After application of the brake pedal 44, the vacuum brake power booster 1 is actuated and the motor-pump unit 52, 53 is switched on for example by a brake light switch (not illustrated). The vacuum brake power booster 1 will then effect braking in the first phase of the brake in action, hydraulic boosting being added thereto after the full pump pressure has built up.

Figure 2:
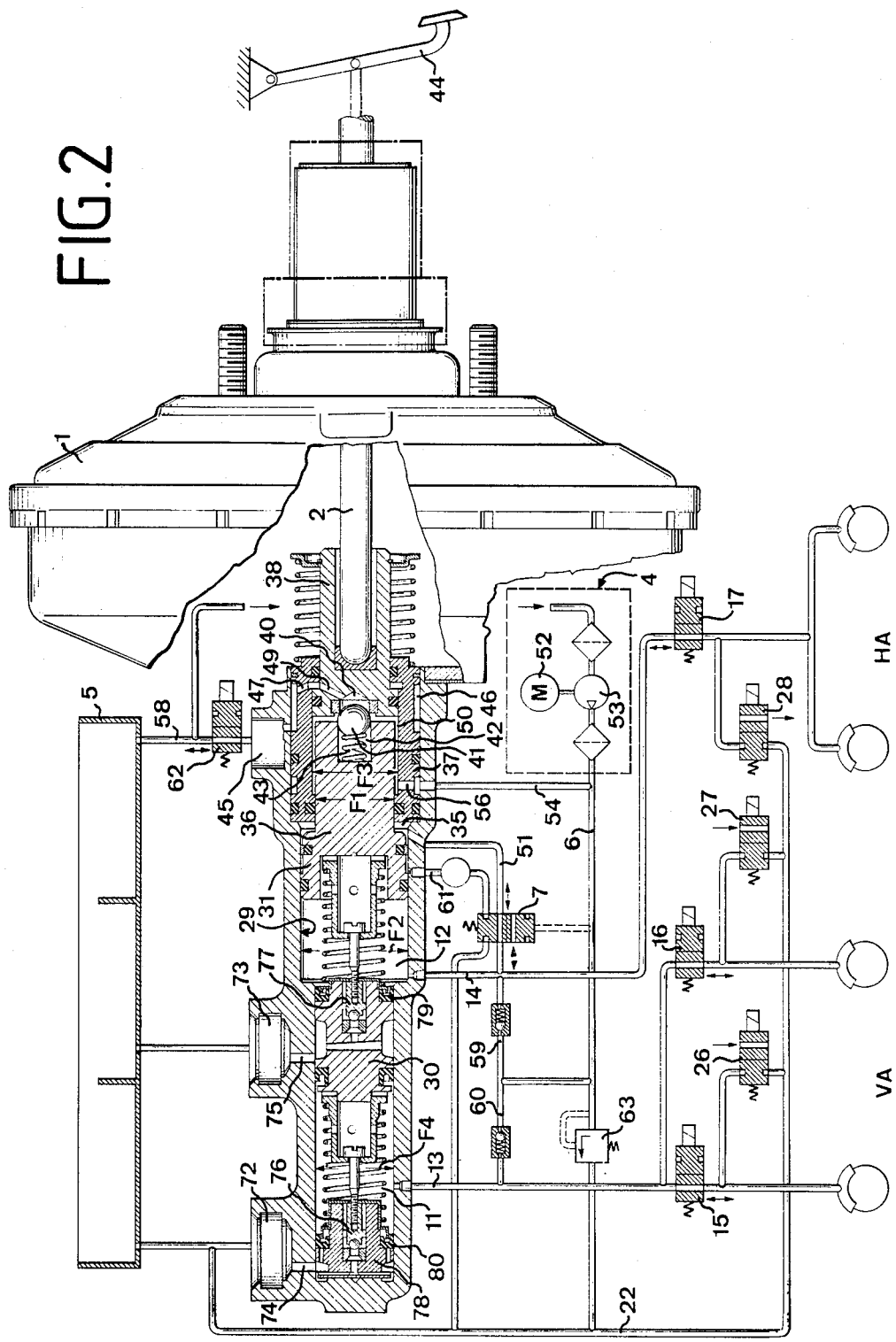
FIG. 2 is an alternate embodiment of the present invention.

FIG. 2 displays a brake system which differs from that according to FIG. 1 only in that the valves 62, 63 are inserted into the line system so that the brake system can be used as a hill holder. If in this brake system the driven wheels reach the traction slip range during the acceleration action, the motor-pump unit 52, 53 will be switched on and the valve 62 will be closed. This causes advance movement of the piston 31, 36, in consequence whereof braking pressure develops in the working chambers 11, 12 and thus in the brake lines 13, 14. Subsequently, the vehicle wheel in the slip range can be braked by a pre-programmed actuation of the valves 15 to 17 and 26 to 28. As the pedal-controlled pressure control valve 40, 41 is without function in this event, a pressure-limiting valve, that is pressure control valve 63, is inserted into the pressure line 6 leading from the pump 53 to the branch lines 59, 60 and to the brake lines 13, 14, respectively, the said valve 63 now taking care of a limited high-level pressure in the dynamic brake circuit.

Figure 3:
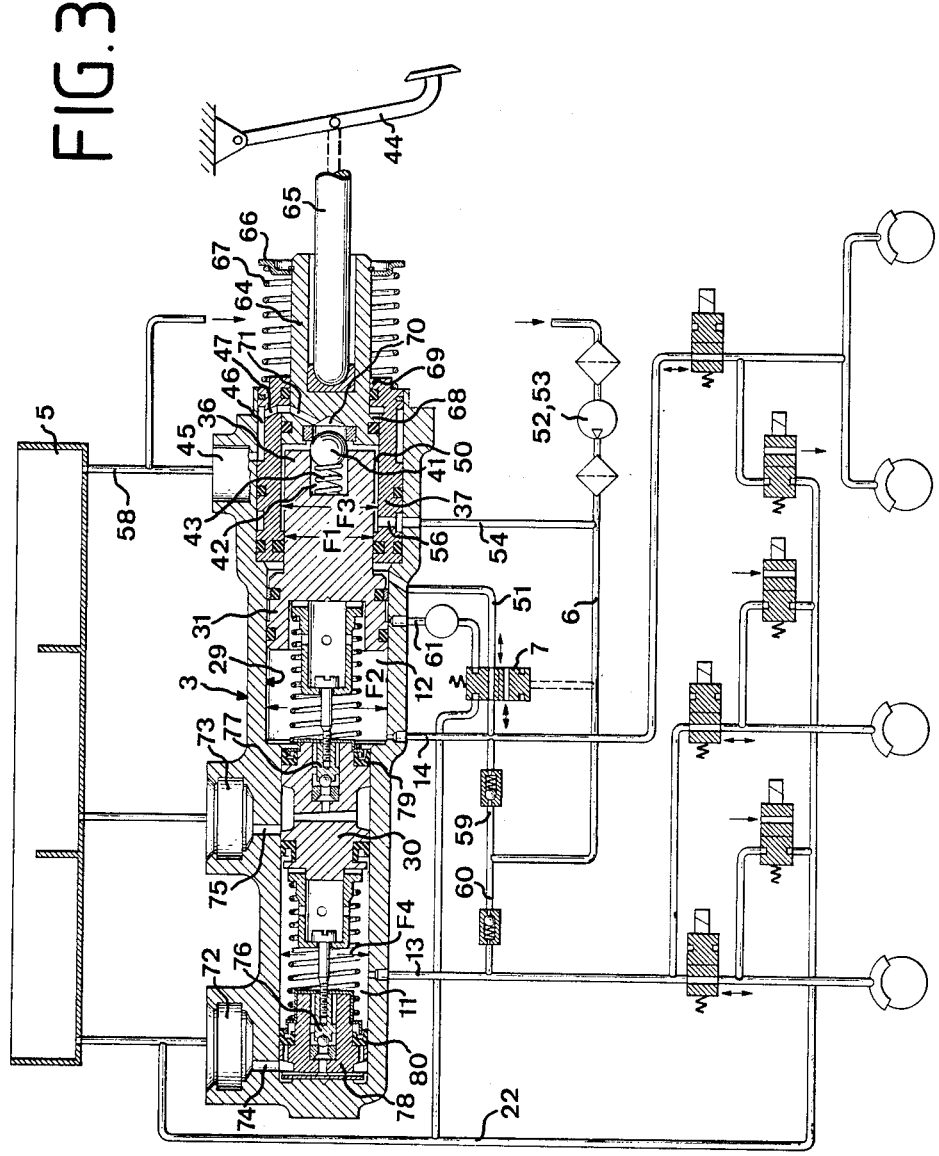
FIG. 3 is a further embodiment of the present invention.

The brake system illustrated in FIG. 3 operates without a vacuum brake power booster and can be used in particular on vehicles which are equipped with a central hydraulic unit. While the hydraulic line system and the various valves are designed and arranged exactly as in the brake system according to FIG. 1, the piston 64 is acted upon directly by the actuating rod 65 coupled to the brake pedal 44. Besides, said piston 64 is rigidly connected to a plate 66 on which the restoring spring 67 takes support so that the piston abuts with its flange portion 68 on the collar 69 of the bushing 37 in the position of brake release (as illustrated in the drawing). On actuation of the brake pedal 44, the actuating rod 65 moves the piston 64 supported in the bushing 37 to the left, while the valve ball 41 is in abutment on the valve seat 70 and closes the duct 71. The primary piston, that is resetting piston 31, is now moved by the piston 64, by which reason a static braking pressure develops in the two working chambers 11, 12 of the tandem master cylinder 3 and propagates via the brake lines 13, 14 up to the wheel cylinders of the wheel brake 18 to 21. It shall be mentioned still that the tandem master cylinder 3 is equipped with connecting sockets 72, 73, supply bores 74, 75 and central valves 76, 77 through which the working chamber 11, 12 are connected to the pressure-fluid supply reservoir 5 in the brake release position, and that the floating piston 30 and the bottom part 78 confining the working chamber 11 are furnished with sealing sleeves 79, 80 which, in conjunction with bores, act as suction valves.

What is claimed is:

1. A hydraulic brake system with slip control for automotive vehicles, incorporating a master cylinder actuatable by a braking force initiated by a brake pedal, having valve means provided between the master cylinder and wheel brakes connected to the master cylinder through which pressure fluid can be removed from brake circuits and can be subsequently replenished out of an auxiliary-pressure source and wherein stroke limitation of the brake pedal is performed during slip control, wherein an auxiliary piston is arranged between a member transmitting the braking force and the piston of the master cylinder and which auxiliary piston, at an end surface closest to the master cylinder piston, is provided with a duct which is adapted to be closed by a valve closure member which is held by a pedal-side shaft portion of the master cylinder piston facing the auxiliary piston, with both the auxiliary piston and the pedal-side shaft portion of the master cylinder piston plunging into a piston chamber which communicates by way of a first pressure-fluid conduit with the auxiliary-pressure source while the duct contained in the auxiliary piston is in connection with a pressure-fluid supply reservoir by way of a second pressure-fluid conduit.

2. A hydraulic brake system as claimed in claim 1, including a valve seat provided at the end surface of the auxiliary piston facing the master cylinder piston and having as its valve closure member a valve ball which is held and guided in a blind-end bore in the shaft portion of the master cylinder piston, said valve closure member being longitudinally displaceable in opposition to force from a spring accommodated in the blind-end bore and being axially limited in its displaceability by a radial projection including a beaded portion at the shaft portion of the master cylinder piston.

3. A hydraulic brake system as claimed in claim 1, wherein a cylindrical bushing is accommodated in a master cylinder bore, in a longitudinal bore of which bushing the shaft portion of the master cylinder piston and the auxiliary piston are longitudinally slidably and sealingly supported, with a space between the shaft portion and the auxiliary piston confining a piston chamber which, on the one hand, is in communication with the auxiliary-pressure source by way of a transverse duct and, on the other hand, is in communication with the pressure-fluid supply reservoir by way of the duct in the auxiliary piston, the flowing of pressure-fluid into and out of the piston chamber being controlled by a pressure control valve including a pressure-limiting valve.

4. A hydraulic brake system as claimed in claim 3, wherein the master cylinder piston is provided as a stepped piston whose smaller step forming the shaft portion is accommodated in the cylindrical bushing while a large step of the master cylinder piston, in conjunction with an end surface of the bushing closest to the master cylinder, the shaft portion and the master cylinder bore, confines an annular chamber which is in communication with a working chamber of the master cylinder via a third pressure-fluid conduit in which a directional control valve is inserted.

5. A hydraulic brake system as claimed in claim 4, wherein the auxiliary-pressure source communicates by way of a first pressure line with the piston chamber and, by way of a second pressure line and branch lines, respectively, communicates with brake lines, said branch lines containing non-return valves.

6. A hydraulic brake system as claimed in claim 5, wherein a second pressure-limiting valve is inserted into the second pressure line leading from the auxiliary-pressure source to the brake lines, which valve in turn is connected to a return line, and in which an electromagnetically actuatable shut-off valve is inserted into the second pressure-fluid conduit providing communication between the duct of the auxiliary piston and the pressure-fluid supply reservoir.

7. A hydraulic brake system as claimed in claim 6, wherein a spring is clamped in between the auxiliary piston and an element supported by a housing projection of the master cylinder housing including the pedal-side end surface of the bushing, which spring mvoes the auxiliary piston to assume its initial position in the position of brake release.

8. A hydraulic brake system as claimed in claim 7, wherein the shaft portion of the master cylinder piston longitudinally slidably accommodated in the master cylinder as well as the longitudinally slidable auxiliary piston arranged coaxially thereto have approximately equal effective cross-sectional surfaces.

9. A hydraulic brake system as claimed in claim 8, wherein the valve seat provided at the end surface of the auxiliary piston closest to the master cylinder is dimensioned such that the valve closure member held in the shaft portion of the master cylinder piston is in sealing abutment with the valve seat when the auxiliary piston and master cylinder piston touch each other operatively.

* * * * *